US000001262H

United States Statutory Invention Registration [19]

[11] Reg. Number: H1262

[43] Published: Dec. 7, 1993

Bacvinskas et al.

[54] ROD EXAMINATION GAUGE

[75] Inventors: William S. Bacvinskas, Bethel Park; John E. Bayer, Pittsburgh; William W. Davis, West Mifflin; George Fodor; Thomas J. Kikta, both of Pittsburgh; Richard L. Matchett, Bethel Park; Roy J. Nilsen, Pittsburgh; Rosemarie Wilczynski, McKees Rocks, all of Pa.

[73] Assignee: The United States of America as represented by the United States Department of Energy, Washington, D.C.

[21] Appl. No.: 769,656

[22] Filed: Oct. 2, 1991

[51] Int. Cl.[5] ..... G21C 17/00

[52] U.S. Cl. ..... 376/252; 73/620; 73/633; 376/251

*Primary Examiner*—Bernarr E. Gregory

*Attorney, Agent, or Firm*—Michael P. Hoffman; William R. Moser; Richard E. Constant

[57] ABSTRACT

The present invention is directed to a semi-automatic rod examination gauge for performing a large number of exacting measurements on radioactive fuel rods. The rod examination gauge performs various measurements underwater with remote controlled machinery of high reliability. The rod examination gauge includes instruments and a closed circuit television camera for measuring fuel rod length, free hanging bow measurement, diameter measurement, oxide thickness measurement, cladding defect examination, rod ovality measurement, wear mark depth and volume measurement, as well as visual examination. A control system is provided including a programmable logic controller and a computer for providing a programmed sequence of operations for the rod examination and collection of data.

15 Claims, 17 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ROD EXAMINATION GAUGE

The U.S. Government has rights in this invention pursuant to Contract No. DE-AC11-76PN00014.

BACKGROUND OF THE INVENTION

The present invention is directed to a device for performing a large number of exacting measurements on radioactive fuel rods.

There has been a need for performing a large number of exacting measurements on radioactive fuel rods. Due to the radiation, these measurements have to be performed underwater with remote controlled machinery of high reliability. A large number of measurements are required to establish the effects of long term operation of the fuel rods. The quantity of data which needs to be collected makes it difficult to perform the necessary measurements with manually operated instruments. Furthermore, it is necessary that the equipment perform the measurements in the same precise sequence each time while minimizing the chance of data rejection due to human error. The measurements need to be reproducible in subsequent tests or repeated measurement sequences. Calibration of the measuring system must be maintained for the length of the measuring sequence. Any adjustment to the measuring instruments needs to be performed remotely from the control console.

SUMMARY OF THE INVENTION

The present invention satisfies the above requirements. An objective of the present invention is to provide for a remote, underwater nondestructive examination of radioactive fuel rods without any degradation of the quality of the measurement. Another objective of the present invention is to automatically scan the fuel rod and then to collect and store the data obtained. A further objective of the present invention is to provide a system which is easy and safe to operate.

DESCRIPTION OF THE PREFERRED EMBODIMENTS

The present invention is directed to a measuring gauge for remote, underwater nondestructive examination of individual radioactive fuel rods, such as Light Water Breeder Reactor (LWBR) fuel rods, at end-of-life. The present invention automatically scans the fuel rod, and collects and stores data as programmed. The present invention can examine 10 foot long fuel rods ranging in diameter between 0.3 and 0.9 inches.

Figure 1:
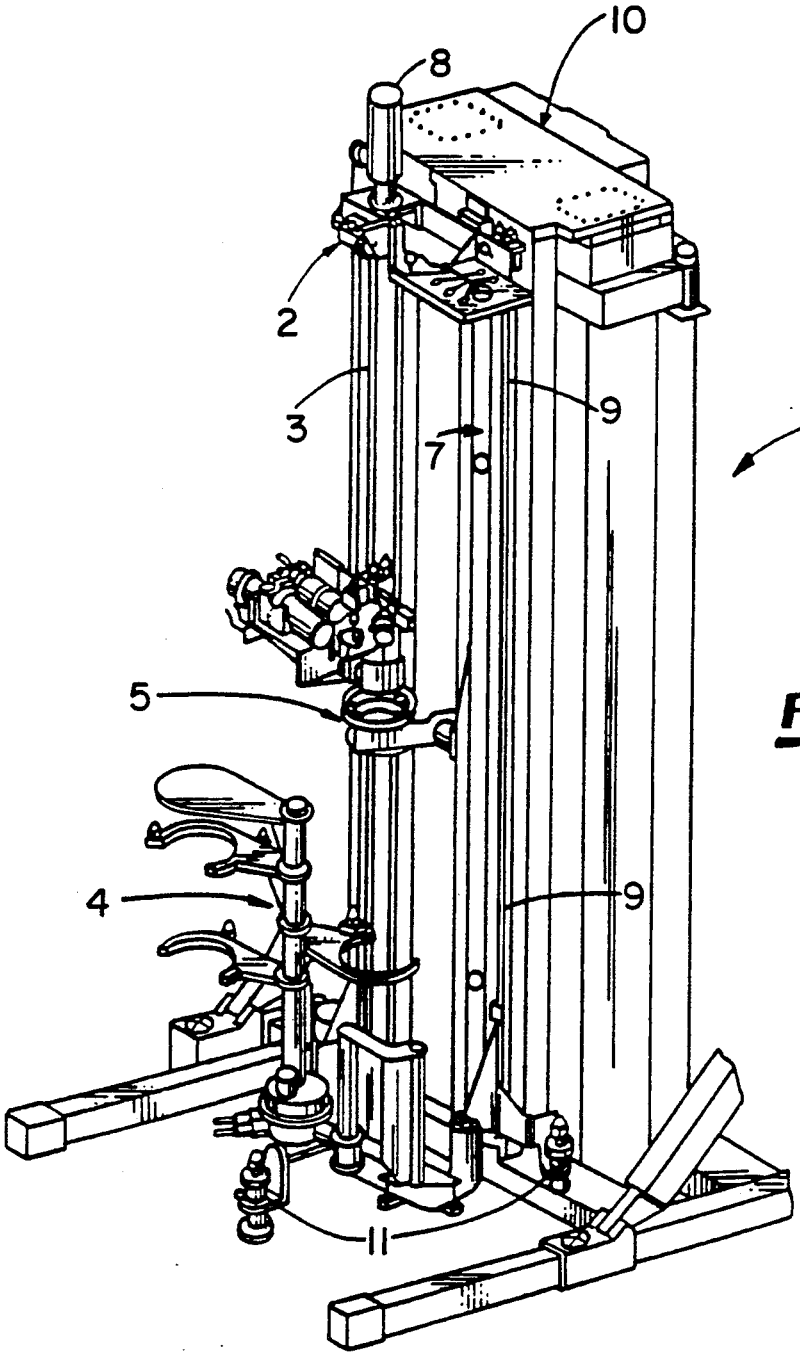
FIG. 1 shows an overall view of the rod examination gauge of the present invention.

The rod examination gauge of the present invention (hereinafter referred to as "REX") includes three separate structures: a support platform; a rod guide and a storage rack; and an instrument table with three measuring instruments of an axial profilometer, an orbiting profilometer, and an ultrasonic transducer (UT) instrument; together with a control system. The REX, as shown in FIG. 1, is submerged in a tank or water pit (not shown) containing a suitable liquid, such as water, at a sufficient depth to protect against radiation from the fuel rods. The REX measuring instruments and closed circuit television camera (CCTV) provide fuel rod length measurement, visual examination, free hanging bow measurement, diameter measurement, oxide thickness measurement, cladding defect examination, rod ovality measurement, and wear mark depth and volume measurements. Diameter, oxide thickness, and wear mark measurements are accurate to $\pm 0.0002$ inches.

As shown in FIG. 1, the REX structures are supported by the frame of a vertical elevator 1 called the Vertical Inspection Gauge (VIG). The elevator transfer carriage is driven (i.e. raised and lowered) by a motor within motor box 10 through a pulley mechanism (not shown in FIG. 1). Support platform 2 supports the fuel rod 3 and is mounted at the top of elevator frame 1. A rod rotator 8 motor is mounted on the support platform 2. A rod guide and instrument storage rack 4 is mounted at the bottom of the elevator frame. The instrument table 5 (the instruments are not shown in FIG. 1) is mounted on the T-slots of the elevator transfer carriage (not shown). The support platform and rod guide and instrument storage rack are clamped to the elevator frame 1 by T-slots 9. The rod guide and instrument storage rack 4 is also supported by legs 11. An axial profilometer (not shown in FIG. 1) is provided on the instrument table for measuring both diameter and oxide thickness. A UT instrument (not shown in FIG. 1) is provided for measuring cladding defect indications, while an orbiting profilometer (not shown in FIG. 1) is provided for measuring rod ovality and wear mark depth and volume measurements. Length measurements, visual examinations, and free hanging bow videos are provided by a CCTV camera mounted on the instrument table.

Figure 2:
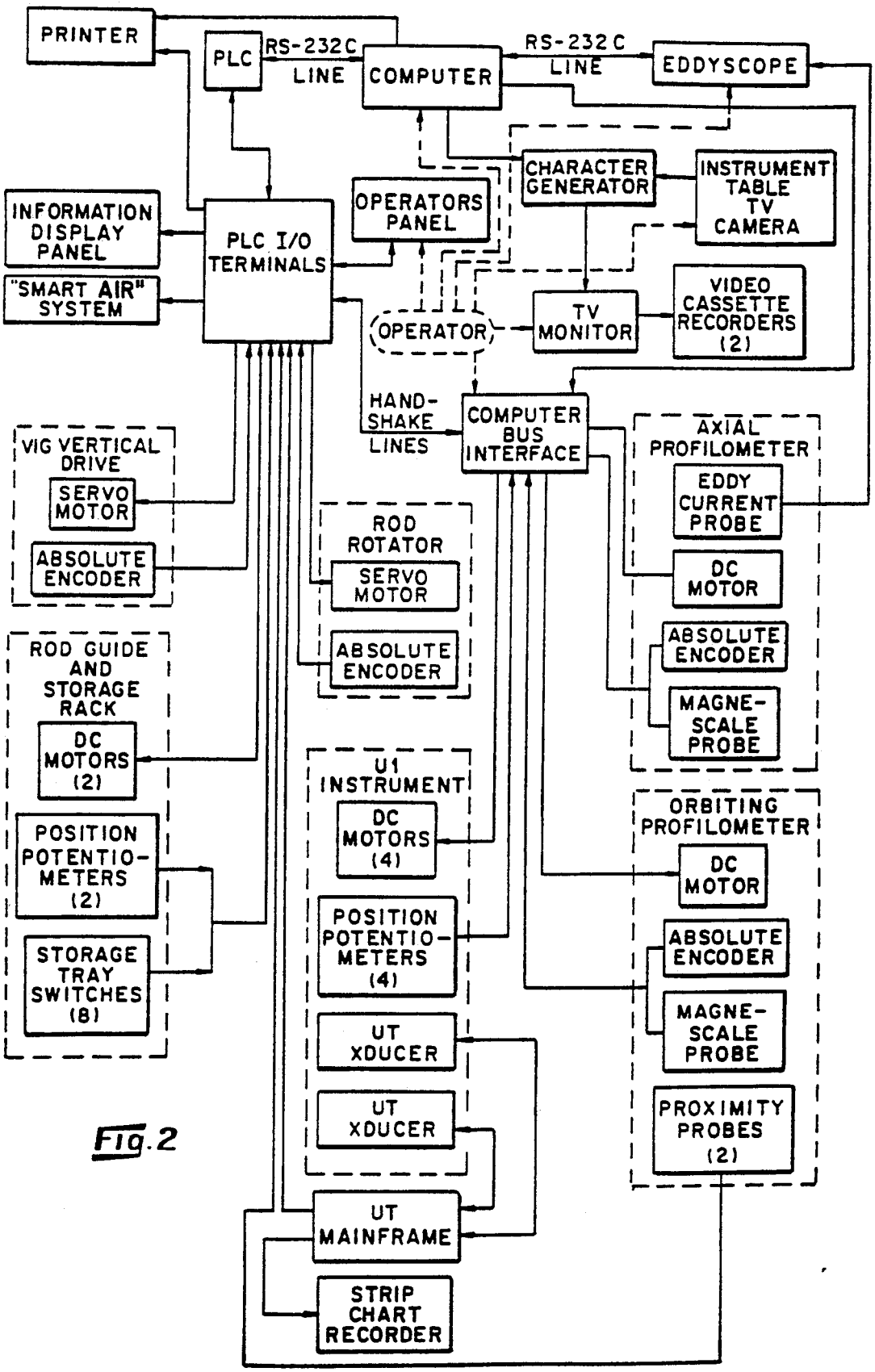
FIG. 2 shows a schematic block diagram of the operation of the rod examination gauge of the present invention.

A REX control system is included and provides a programmed sequence of operations needed to perform the rod examinations. The heart of the control system is a programmable logic controller (PLC) and a computer. A schematic block diagram of the control system is shown in FIG. 2. The PLC controls most of the larger drive motors, monitors the system readiness, and provides information to the operator's panel. The computer automatically collects and stores digital data from the rod examinations, operates several of the profilometer DC motors, and acts as an electronic route card to guide the operator through the rod examination sequence. Data validity checks are performed as the information is collected to insure uniformity and integrity. The control system is designed to present the correct sequence of events to the operator in order to maximize the efficiency of the examinations. The PLC and computer communicate with each other to perform this task.

A description of each major assembly of REX is provided below along with its respective functions and a description of the examination performed.

Figure 3:
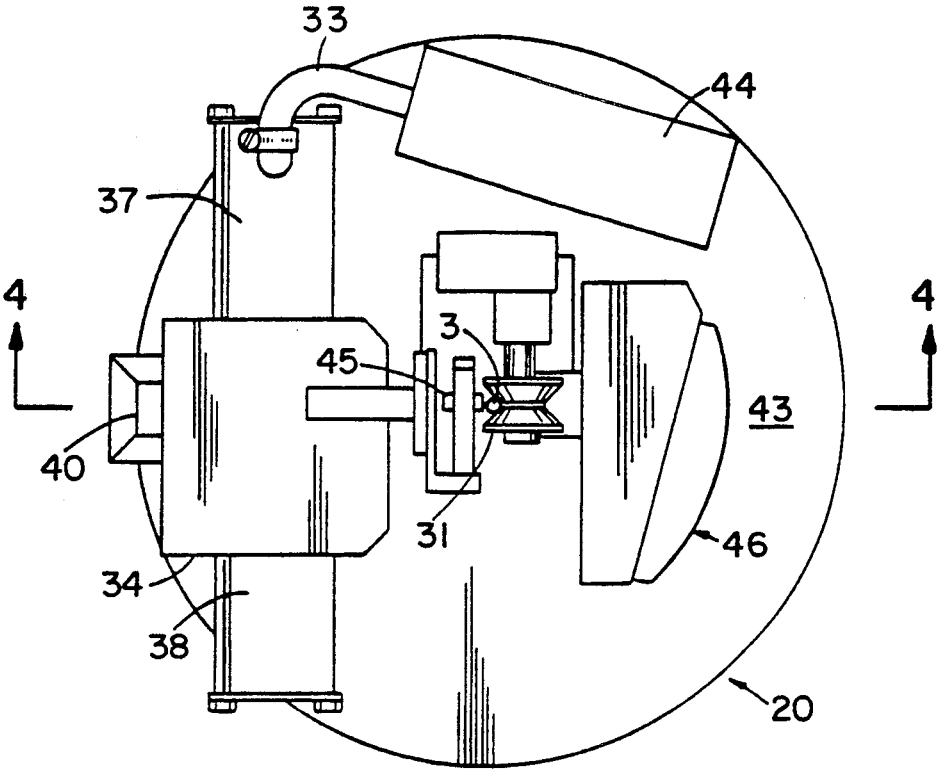
FIG. 3 is a schematic view of the axial profilometer of the present invention.
Figure 4:
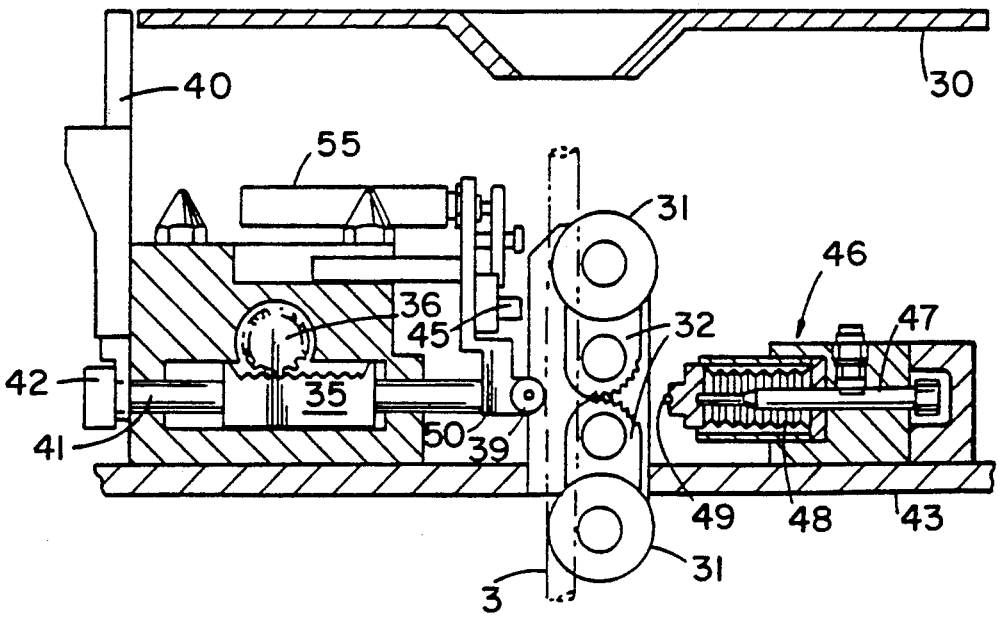
FIG. 4 is a cross-sectional view of the axial profilometer of the present invention taken along section lines 4—4 in FIG. 3.

The axial profilometer 20, as shown in FIGS. 3 and 4, contains instruments which measure fuel rod diameter and oxide thickness. Fuel rod diameter is measured at four angular orientations, 45 degrees apart, with a diameter measurement every 0.010 inch along the rod length. The fuel rod oxide thickness is measured at four angular orientations, 90 degrees apart, with an oxide thickness measurement at every 0.500 inch over the rod length.

A description of the axial profilometer components follows.

A roller assembly remotely aligns and positions the fuel rod in the center of the profilometer. The assembly includes two spring loaded V-rollers 31, each mounted on separate arms 32. One roller is located on either side of the measuring region. The two arms are geared together to ensure that the rod 3 is maintained vertical through the measuring region, thus reducing any possible measurement error.

The drive assembly 34 includes a precision tungsten carbide backup roller 39 which positions the rod 3 firmly against the roller assembly. The backup roller 39 is positioned by a rack 35 and pinion drive 36 system using a DC motor within housing 37. An encoder within housing 38 indicates the location of the backup roller 39. Repeatable positioning of the backup roller (i.e. for positioning the fuel rod 3) is required to obtain precision diameter measurements. This is accomplished through the use of a "hard stop" or spacer 40. The hard stop is held between the drive assembly housing 34 and the shaft stop 42 on the rack shaft 41, as shown in FIG. 4. The motor is run until the "hard stop" is pinched between the drive assembly housing and the shaft stop 42. A different hard stop is used for seed, blanket, and reflector type rods to position the rod in the nominal center of the base plate 43.

The junction box 44 is a pressurized, watertight box capable of providing underwater cable connections on the instrument. The electrical wires from the DC motor and resolver are run from the motor housing 37 into the junction box 44 through plastic tubing 33. The motor housing in turn is pressurized via the junction box through the plastic tube. The eddy current probe cables (not shown) also enter the junction box. An amplifier for the eddy current probe 45 is mounted within the assembly.

A magnescale probe.assembly 46 with a magnescale probe 47 is provided to measure the diameter of the fuel rod. The magnescale probe, such as a Sony Magnescale probe Model LY-201, can be installed in the waterproof stainless steel housing of the magnescale probe assembly 46 which is bolted to the base plate 43. A high compliance stainless steel welded bellows 48 provides a flexible seal for the probe. A 0.125-inch diameter tungsten carbide horizontal measuring tip 49 is mounted on the end of the bellows. This horizontal measuring tip compensates for any slight horizontal misalignment of the fuel rod. The sealed magnescale probe housing assembly 46 is pressurized with dry nitrogen through a 0.125-inch diameter hose (not shown). A cover 30 is provided over the axial profilometer to prevent damage and to guide the fuel rod into the instrument.

The magnescale probe assembly maintains a constant 0.3 pound gauging force on the rod with the probe tip. Since the axial profilometer travels vertically along the rod, water pressure on the metal bellows seal around the probe tip varies with water depth. This external pressure change is compensated for by an automatic control, which varies the nitrogen pressure maintained in the magnescale housing. The control system which adjusts the magnescale housing pressure is called the "smart air" system.

Figure 5:
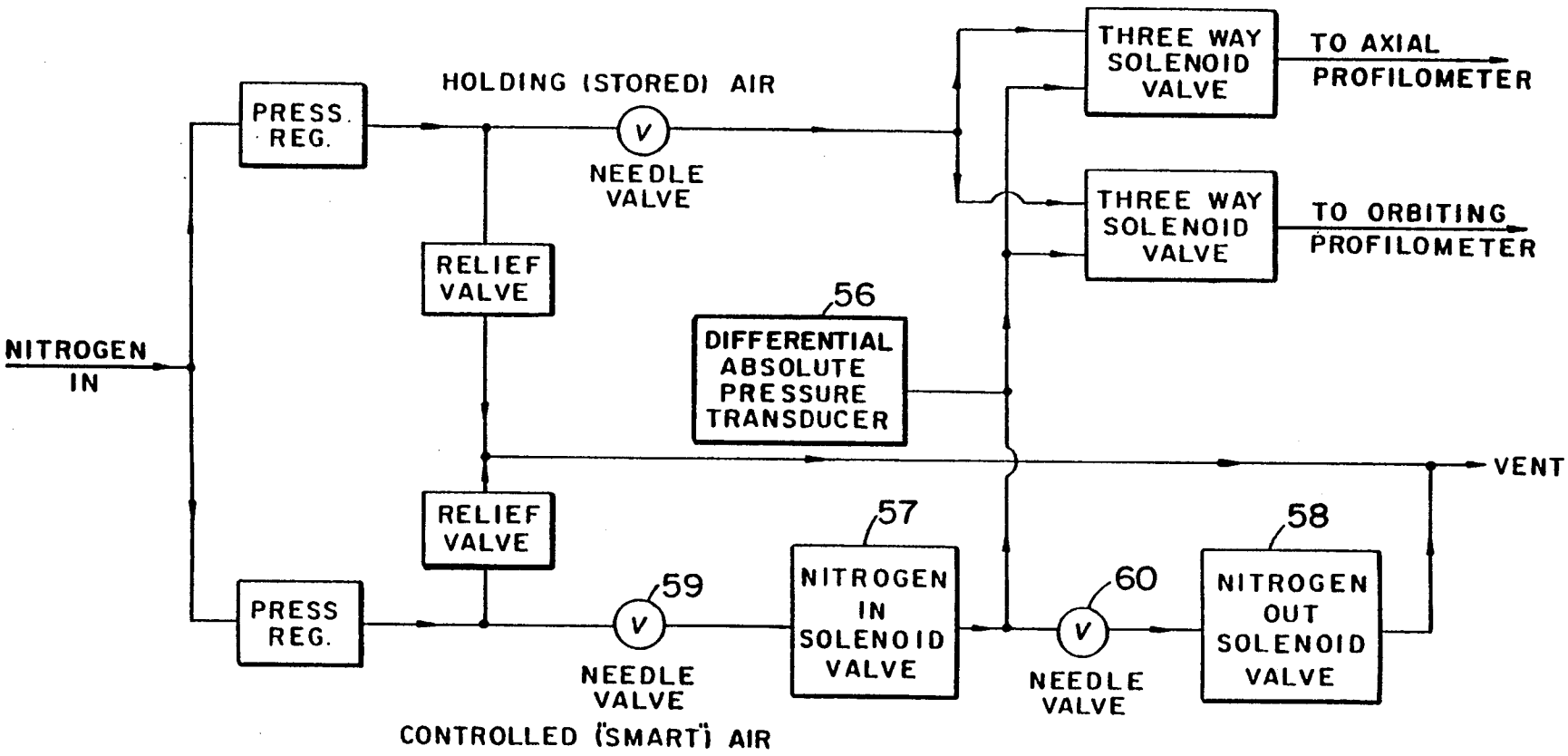
FIG. 5 is a schematic diagram of the "smart air" system of the present invention.

A schematic diaqram of the "smart air" system is shown in FIG. 5. The "smart air" control panel is located above water approximately 100 feet from the magnescale probe assembly. A differential absolute pressure transducer 56 with one side open to the atmosphere monitors the nitrogen pressure maintained within the magnescale housing. The required nitrogen pressure for a specific water depth is determined based on the absolute encoder reading of the instrument table elevation. The actual pressure supplied to the magnescale probe assembly housing is modulated by the programmable logic controller using two solenoid valves. One solenoid valve 57 allows nitrogen into the system when more pressure is required, while the second solenoid valve 58 vents nitrogen to the atmosphere when less pressure is required. Needle valves 59, 60 respectively on the inlet and exhaust lines control the flow rate of the nitrogen to and from the magnescale probe housing. The "smart air" system continuously adjusts the pressure while the magnescale is in use. The magnescale probe is retracted by lowering the nitrogen pressure in the magnescale housing which permits the external water pressure acting on the metal bellows to retract the probe.

Figure 6A:
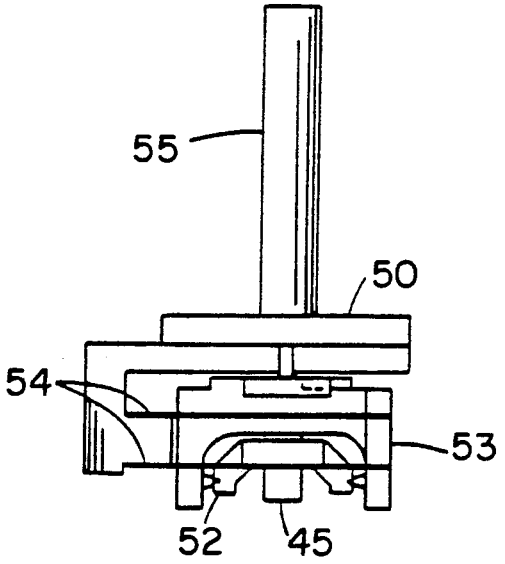
FIG. 6 consists of FIGS. 6A and 6B, which are schematic diagrams of the eddy current transducer mounting system on the axial profilometer of the present invention.
Figure 6B:
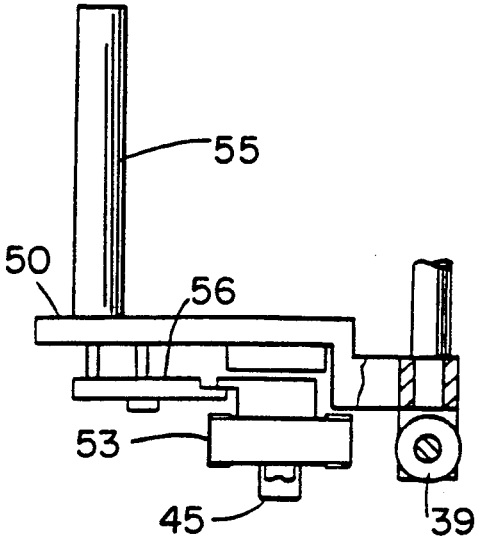

A 5 MHz eddy current probe 45 (see FIG. 3) is used to measure the fuel rod oxide thickness. The probe is mounted on frame 50 (see FIG. 4) with the backup roller 39 as shown in FIG. 6. The cross-sectional view in FIG. 6 shows the eddy current probe fully extended. The eddy current probe 45 is clamped on a pivoting fixture 52 which allows the probe to pivot about its longitudinal axis. The pivoting allows the probe to compensate for slightly tilted rods. The clamp bracket 53 is attached to the frame 50 via four flat springs 54. A hydraulic cylinder 55 retracts the eddy current probe through retracting arm 56. However, the hydraulic cylinder exerts no force on the eddy current probe when the probe is extended. It only allows the springs to extend the eddy current probe against the rod.

Figure 7:
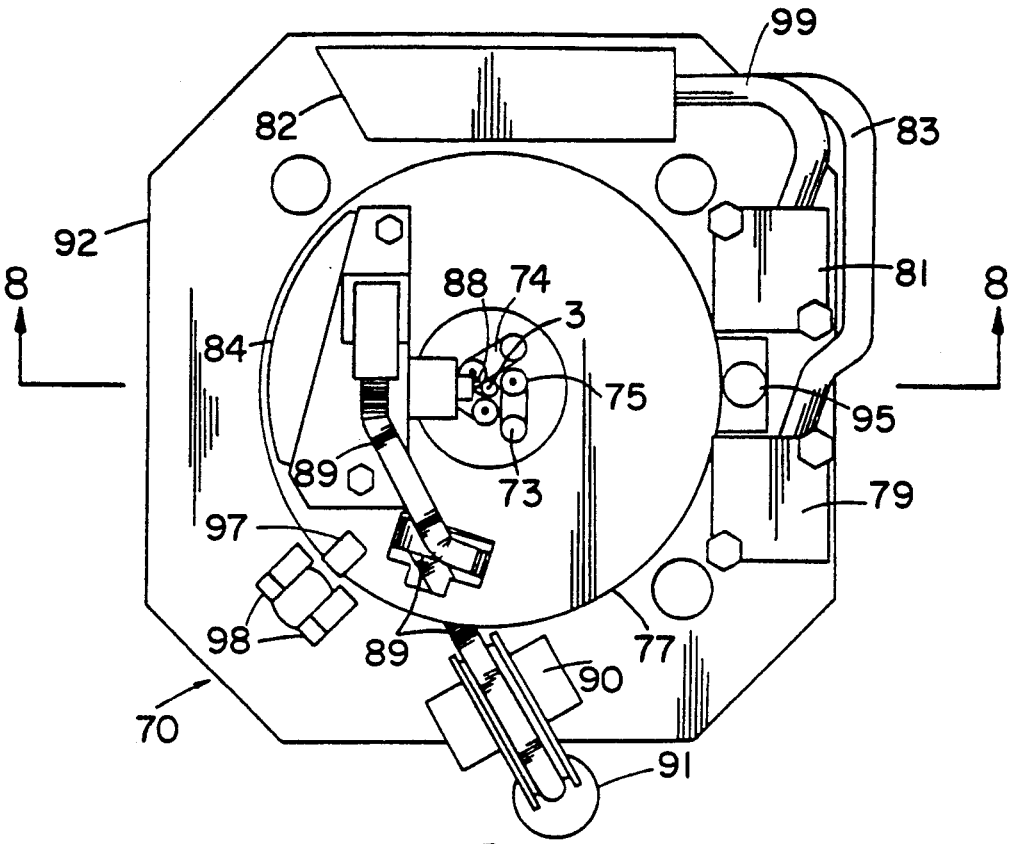
FIG. 7 is a schematic view of the orbiting profilometer of the present invention.
Figure 8:
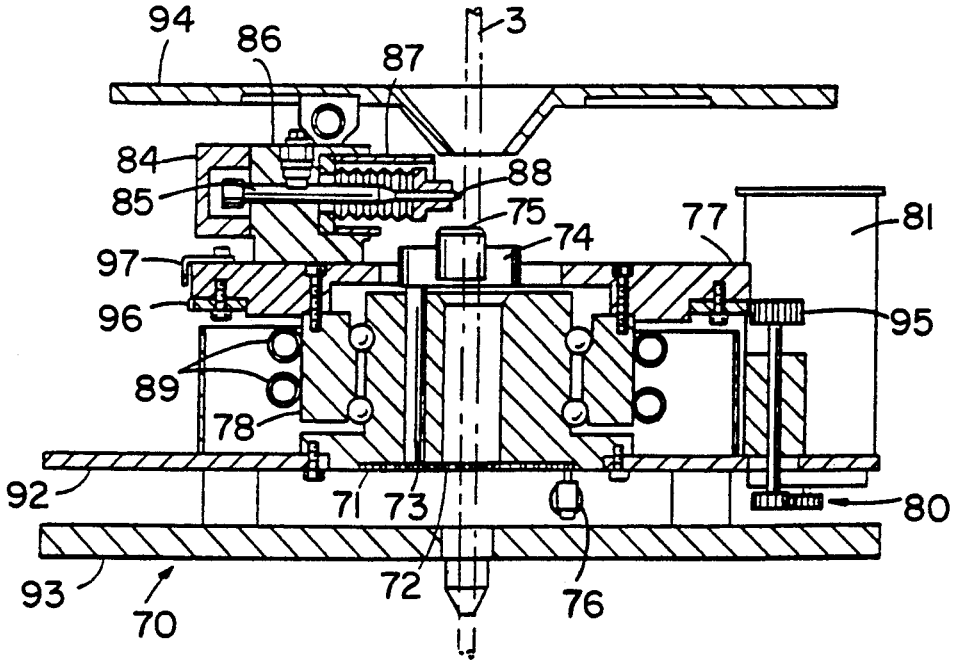
FIG. 8 is a cross-sectional view of the orbiting profilometer of the present invention taken along section lines 8—8 in FIG. 7.

The orbiting profilometer 70, as shown in FIGS. 7 and 8, measures fuel rod wear mark depth and volume and fuel rod ovality. Rod ovality is measured using 360 degree scans at the designated elevations with data collected at every 2.0 degrees. Wear marks are mapped by collecting measurements at every 0.5 degrees over a 60-degree scan at 0.005-inch vertical increments over the length of the wear mark. Wear volume is calculated from the measured surface profiles cf the wear mark scans. The individual components are described below.

The roller assembly, as shown in FIG. 8, provides a secure, repeatable means for gripping and centering the fuel rod. Without a secure means of gripping and centering the rod, precision measurements cannot be made. The centering mechanism includes an internal gear 71 trapped by three pinion gears 72 rotating on shafts 73. A follower arm 74 is clamped on each of the shafts. A nonrotating tungsten carbide roller 75 is mounted on the end of each arm. Actuation of the roller assembly is accomplished with two hydraulic cylinders 76 that rotate the internal gear 71.

A rotary platform 77 is mounted on a custom fabricated, super precision stainless steel bearing 78 (accurate to 0.000005 inch radially and 0.000005 inch axially). A super precision bearing is preferred, so the measurements on the fuel rod 3 will not be masked by inaccuracies of the bearing. The rotary platform is driven by a DC motor housed in housing 79 through a precision gear mechanism 80 including a drive spur gear 95 and a rotary platform ring gear 96. An absolute encoder within housing 81 indicates the angular position of the rotary platform 77. Measurements are made while rotating in only one direction in order to increase measurement accuracy by eliminating the effects of horizontal probe deflection. Two proximity switches 98 are mounted on the profilometer and cooperate with a proximity probe target 97 mounted on the rotary platform to prevent over rotation to preclude damage to the magnescale probe assembly cable.

The junction box 82 provides a pressurized cavity underwater to allow cable connections. The electrical wires from the DC motor and encoder housings are run into the junction box in separate water tight plastic tubes 83, 99. The motor and encoder housings in turn are pressurized through the plastic tubes.

The magnescale probe assembly 84 is used to measure fuel rod wear marks and rod ovality. A magnescale probe 85, such as a Sony magnescale probe (Model LY-201), is oriented radially toward the gauge center. The probe is installed in a stainless steel, waterproof housing 86 which is bolted to the rotary platform 77. A high compliance stainless steel bellows 87 provides a flexible seal for the probe. The measuring tip 88 is a 0.040 inch diameter spherical tungsten carbide ball. The orbiting profilometer magnescale probe assembly is identical to the axial profilometer magnescale probe described above, except for the cable handling and the type of measuring tip. It is operated in an identical manner to the axial magnescale probe, described above, through the same "smart air" control panel. The output cable 89 of the probe and the magnescale pressurization hose are encased in a stainless steel flexible conduit. The cable is routed below the rotary platform and wrapped around the bearing, and then travels over a roller 90 to a dead weight 91. This cable routing allows the probe to travel one revolution without tangling.

The assembly also includes a bearing support plate 92 and a base plate 93 for supporting the assembly and a cover plate 94.

Figure 9:
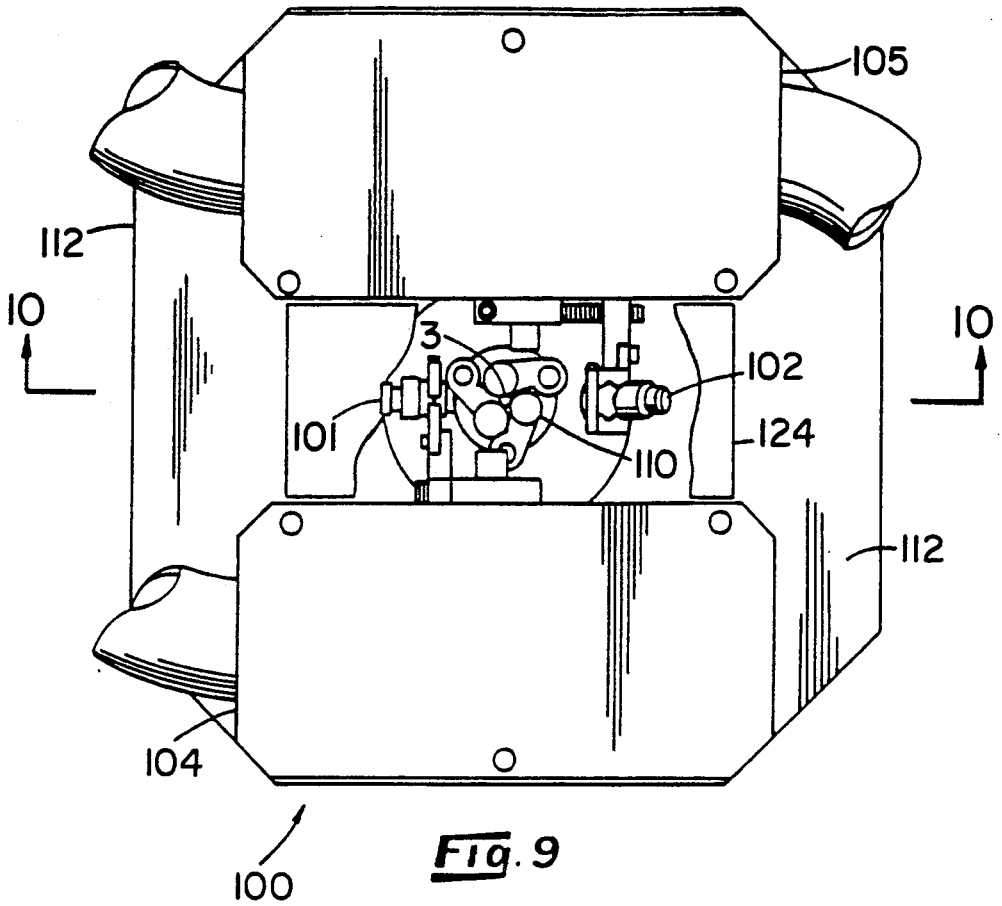
FIG. 9 is a schematic view of the ultrasonic transducer of the present invention.
Figure 10:
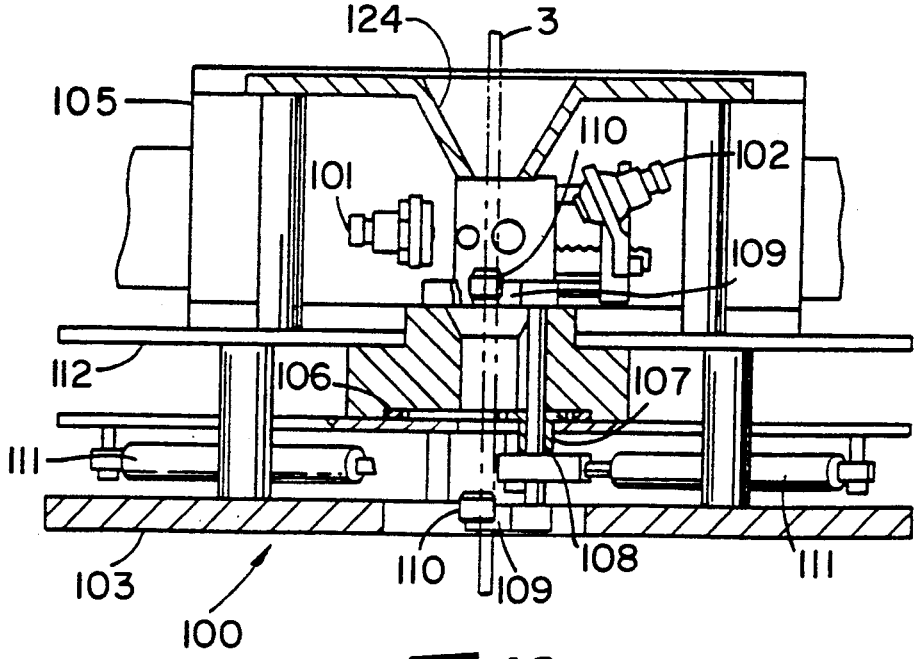
FIG. 10 is a cross-sectional view of the ultrasonic transducer of the present invention taken along section lines 10—10 in FIG. 9.
Figure 11A:
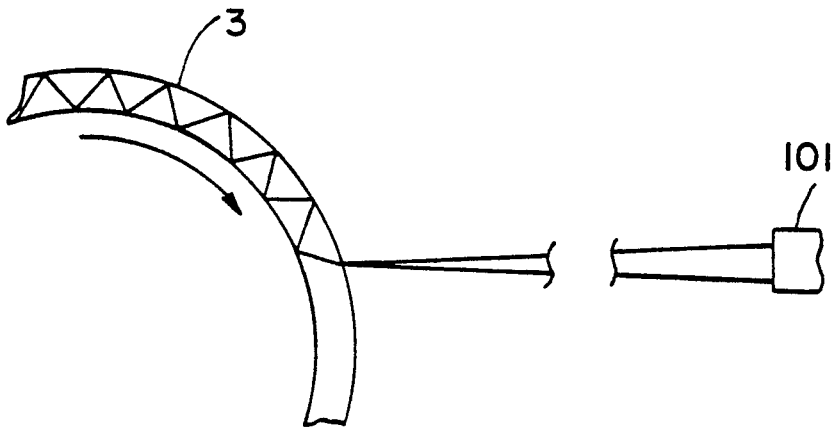
FIG. 11, consisting of FIGS. 11A and 11B, shows the operation of the ultrasonic transducers in accordance with the present invention.
Figure 11B:
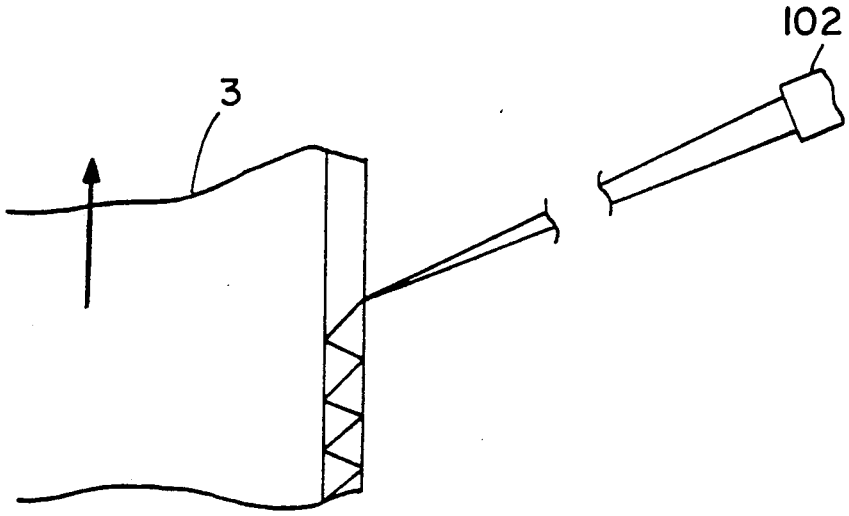

The ultrasonic instrument 100, as shown in FIGS. 9 and 10, employs two 15 MHz ultrasonic transducers to detect rod cladding defects. The transducers operate in the shear wave mode using the immersed (water pit) pulse-echo techniques, as shown in FIG. 11. One transducer 101 is aligned to detect longitudinal cladding defects parallel to the axis of the fuel rod. The other transducer 102 is aligned to detect circumferential cladding defects, those which are transverse to the axis of the fuel rod 3. Both transducers are focused to provide an 0.020 inch ultrasonic beam on the rod surface. A cover plate 124 protects the transducers and guides the fuel rod into the instrument.

Cladding defects are detected by rotating the fuel rod a complete revolution, then moving the transducers down 0.018 inches. This allows a 10 percent overlap of surface coverage. The rod rotational speed is set to allow a constant rod surface speed past the transducers for all diameter rods. The UT head, shown in FIGS. 9 and 10, comprises three assemblies mounted on a base plate 103 of a roller assembly, a longitudinal motor box 104, and a circumferential motor box 105. The two motor boxes are identical except for the transducer mounts.

The roller assembly includes means for gripping and maintaining the fuel rod at the center of the instrument. The roller assembly has an internal gear 106 trapped by three pinion gears 107 rotating on shafts 108. Two sets of follower arms 109 are clamped on each shaft. A freely rotating tungsten carbide roller 110 is provided on the end of each arm. Two hydraulic cylinders 111 actuate the roller assembly by rotating the internal gear.

Figure 12:
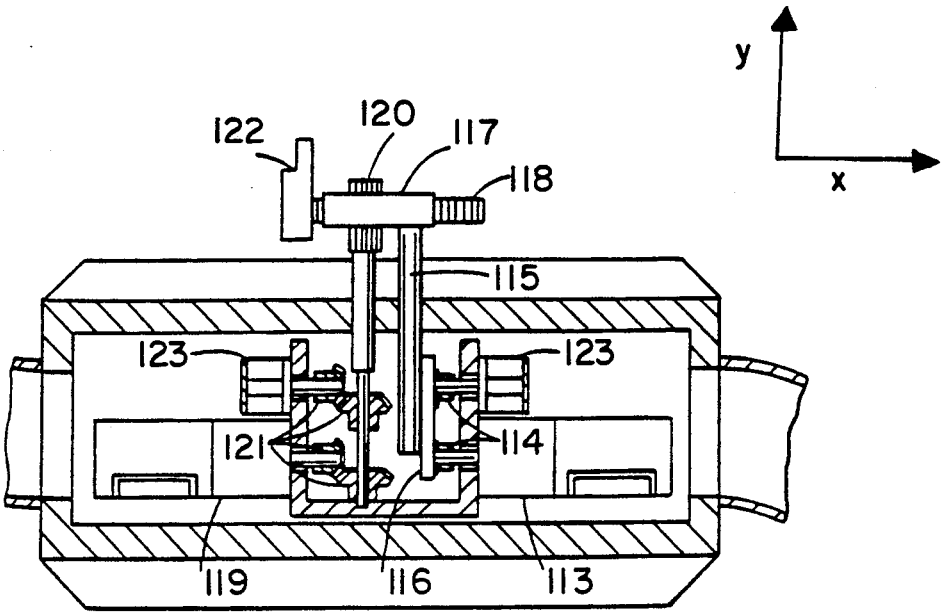
FIG. 12 is a cross-sectional view showing the ultrasonic transducer motor box of the present invention.

Two motor boxes are mounted on the motor box mounting plate 112. One motor box 104 positions the longitudinal transducer while the other 105 positions the circumferential transducer. Each motor is controlled by the computer to provide two axes of transducer motion. The internal drive mechanisms of each motor box, as shown in FIG. 12, are identical. DC motor 113 drives a rack 116 through a spur gear 114 on the motor shaft to produce y-direction transducer motion. The shaft 115 is guided internally by a slide to reduce transducer alignment error. At the end of the shaft is guide block 117 which guides the rack for x-direction transducer motion. The x-direction rack 118 is driven by DC motor 119 through a pinion shaft 120 and a set of bevel gears 121. The mounting arm 122 for the transducer is attached to the x-direction rack. The position potentiometers 123 provide a remote indication of transducer position of each axis.

Figure 13:
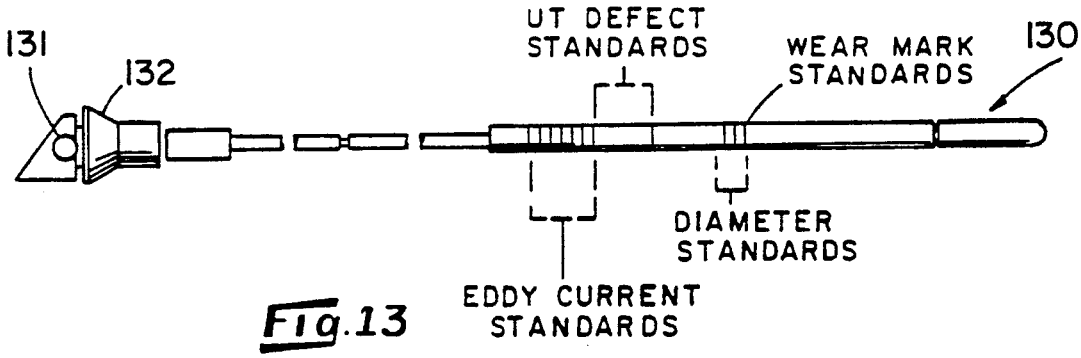
FIG. 13 shows standardization bar which can be used in the present invention.

A standard bar 130, as shown in FIG. 13, is provided for each rod diameter and contains all the standards to calibrate each instrument. Each instrument requires a pre-examination calibration and a post examination calibration to insure instrument drifting has not occurred during the exam. Each bar contains features of a known size to perform calibrations of length, rod cladding defect (UT), diameter, oxide thickness, and wear mark depth and rod ovality. Each standard bar is identical except for the diameter of the standards on the lower 25 inches of the bar. In the standard bar, 131 is a lift hole and 132 is a suspension device.

Figure 14A:
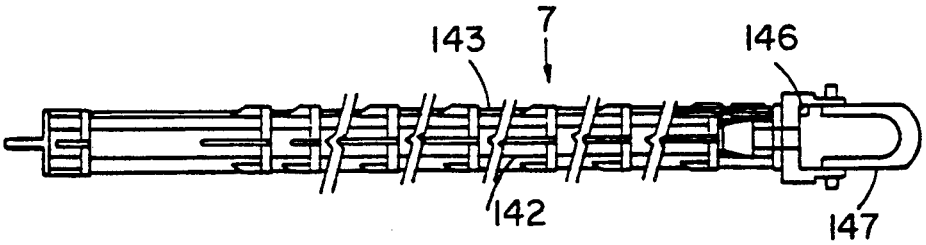
FIG. 14, consisting of FIGS. 14A and 14B, illustrates a rod caddy for carrying the radioactive fuel rods in accordance with the present invention.
Figure 14B:
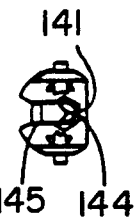

The rod caddy 7, as shown in FIG. 14, has a V-shaped trough 141 and a semi-circular cover 142 with a cover hinge 143 to transport fuel rods, such as LWBR fuel rods, to and from the REX. The caddy supports all types of LWBR fuel rods. It is transported in the water pit via a crane and appropriate rigging. The caddy cover cannot be opened during vertical transfer of the rod in order to reduce the possibility of damaging the rod. The rod caddy also includes a collet seat 144, a transfer slot 145, a cover stop 146 and a shackle 147.

Figure 15:
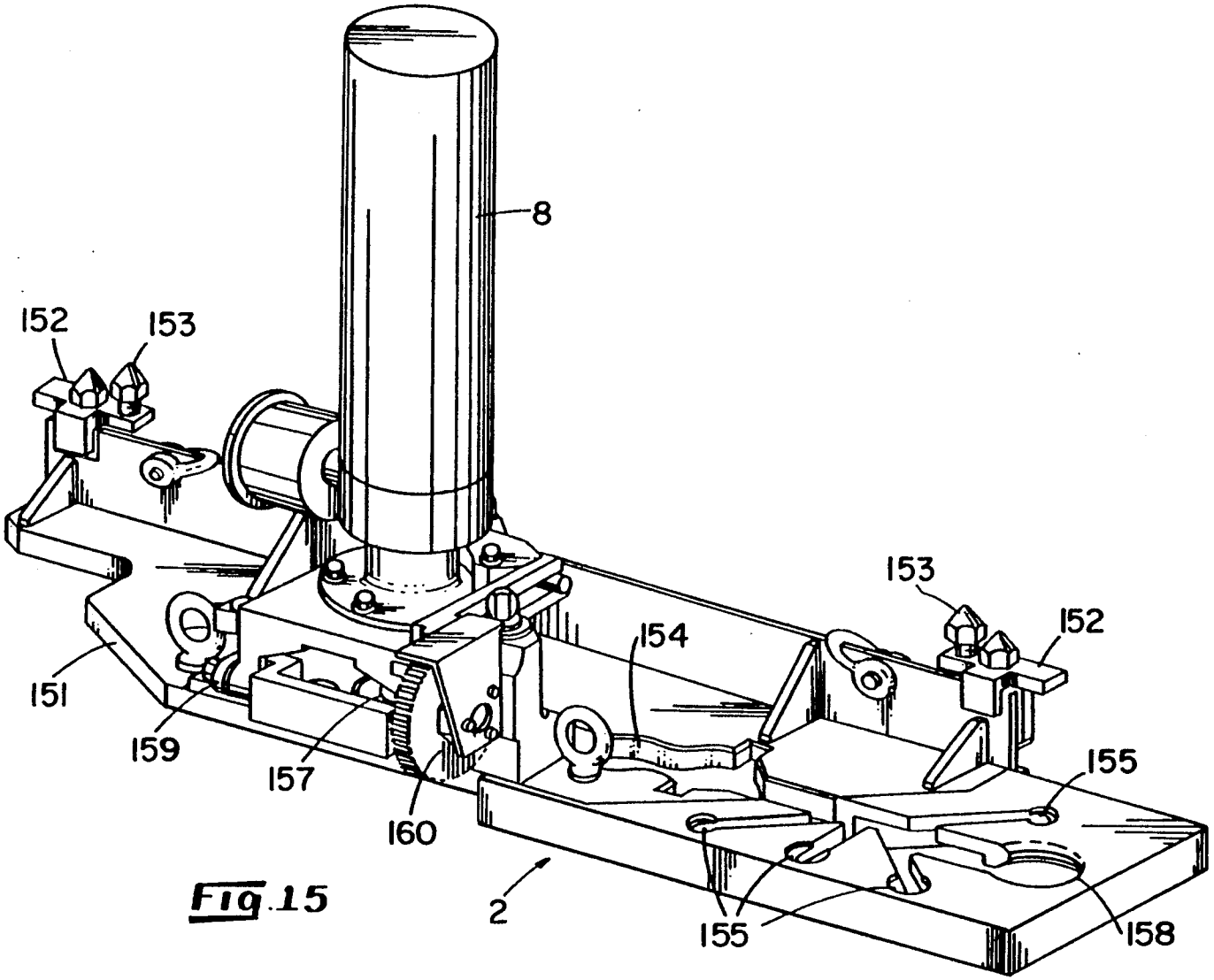
FIG. 15 is a view of the support platform in accordance with the present invention.

As shown in FIG. 15, the support platform 2 supports the rod suspension assembly 165 in the exam port 157, provides a storage port 158 for the rod caddy 7, and provides storage ports 155 for the four standard bars used to calibrate the instruments. The support platform 2, as shown in FIG. 15, includes a horizontal stainless steel plate 151 clamped to the T-slots 9 at the top of the elevator frame via T slots clamps 152. Leveling screws 153 are provided for leveling the support platform 2. A transfer slot 154 connects the exam port 157 and the rod caddy storage port 158 to allow transfer of the fuel rod. The standard bar storage ports 155 are located off the transfer slot 154. Centered over the exam port is the rod rotator motor 8. This motor is hinged by use of a rod rotator motor hinge 159, allowing it to be rotated from the vertical to the horizontal position via a worm gear drive mechanism 160. This action permits access to the exam port for fuel rod and standard bar loading and unloading.

Figure 16:
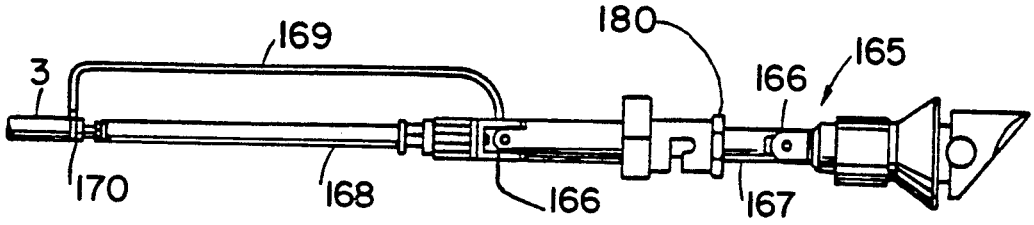
FIG. 16 shows the rod suspension assembly in accordance with the present invention.
Figure 17A:
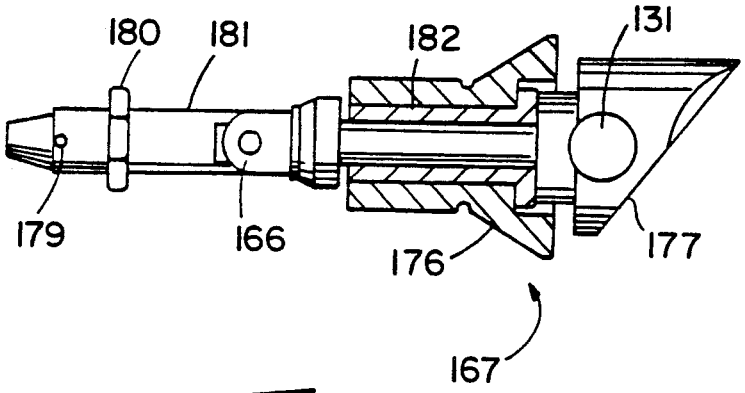
FIG. 17, consisting of FIGS. 17A and 17B, shows the suspension device in accordance with the present invention.
Figure 17B:
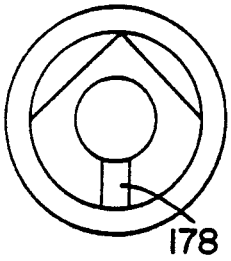

The rod rotator motor 8 mounted on the support platform 2 can rotate the fuel rod or standard bar about its longitudinal axis to a given angular orientation. The rod rotator motor, a DC servo-motor, is controlled by the PLC and drives the output shaft thereof. An absolute encoder is coupled to the servo-motor shaft to provide the angular orientation of the motor shaft and therefore the rod orientation. A brake clamps the rod rotator output shaft in position to prevent unwanted rod rotation. A horizontal drive pin (not shown) on the rod rotator output shaft engages the suspension assembly. The suspension assembly is shown in FIGS. 16 and 17. This engaging/disengaging of the rod suspension assembly permits the operator to insert the rod into the exam port at any orientation.

The rod suspension assembly 165, as shown in FIG. 16, suspends the fuel rod 3 from the exam port 157 in the support platform 2. A double universal joint 166 is incorporated in the rod suspension assembly, so that each instrument can automatically align a bowed rod in the instrument at any elevation. The universal joints also allow the instruments to compensate for any misalignment of the exam port, instrument table, and rod guide. The rod suspension assembly includes a suspension device 167, a collet 168, a secondary drop protection device 169, and a push nut 170. The suspension device is attached to the collet to form a one piece assembly for rod handling operations. However, the collet and suspension device can be separated, if necessary.

The suspension device 167, as shown in FIG. 17, contain a tapered collar 176 which fits into the exam port 157 on the support platform 2. A bushing 182 is provided within the tapered collar. The collar allows the suspension device body to rotate freely for rod rotator motor alignment. A drive shaft coupler 177 at the top of the body contains an angled alignment surface which allows the drive pin on the rod rotator motor to self engage the coupler slot 178. The rod rotator motor can then rotate the rod to any orientation. A cross pin 179 on the end the suspension device body provides positive engagement to the collet 168 through the J-slot connector 189 (see FIG. 18). A retainer nut 180 on the body 181 of the suspension device prevents collet and suspension device disengagement. Universal joint 166 is located between the coupler and the cross pin at the end of the body.

Figure 18:
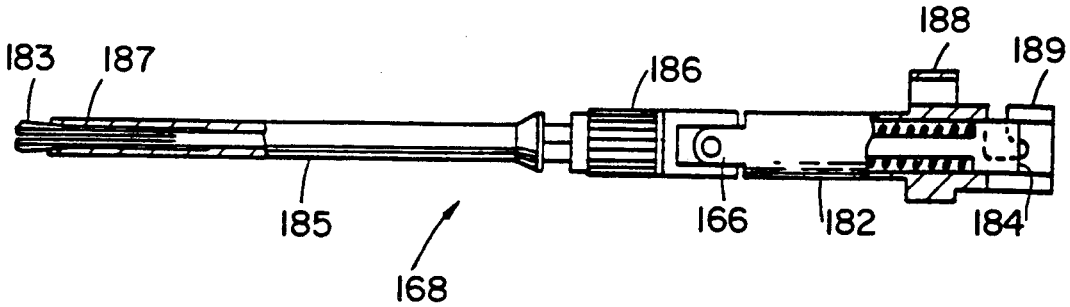
FIG. 18 shows a collet in accordance with the present invention.

As shown in FIG. 18, the collet includes two main subassemblies: the connector 182 and collet finger assembly 183. A spring loaded plunger 184 in the connector captures the suspension device cross pin 179 in the connector J-slot 189. The collet fingers 183 grip onto the end stem of the rod 3. The adjusting nut 186 is rotated with a splined wrench. The collet tube 185, which is prevented from rotating, advances over the fingers as a result of adjusting nut 186 movement. A taper 187 on the inside of the collet tube forces the fingers 183 to close over the rod stem. The adjusting nut 186 is torqued until sufficient friction is produced between the rod stem and collet fingers to prevent the rod from slipping. The universal joint 166 joins the connector and collet finger assembly together. A rod caddy hex seat 188 assists in arranging the collet within the rod caddy 7.

The secondary drop protection device 169, shown in FIG. 16, provides an additional method of fuel rod gripping. This device has a 0.031-inch diameter stainless steel wire rope with a loop at one end of the drop protection device large enough to slip over the fuel rod end stem and a thin piece of stainless steel sheet at the other end. The loop end of the wire rope is slipped over the fuel rod end stem and is held in place by a push nut 170 installed on the end stem. The collet is then attached to the fuel rod. The other end of the drop protection device is pushed through the universal joint 166 on the collet 168. The stainless steel sheet acts as a needle during installation through the universal joint. Once installed between the fuel rod and collet, the secondary drop protection device limits the fuel rod drop distance to one inch in the event the fuel rod becomes disengaged from the collet.

Figure 19:
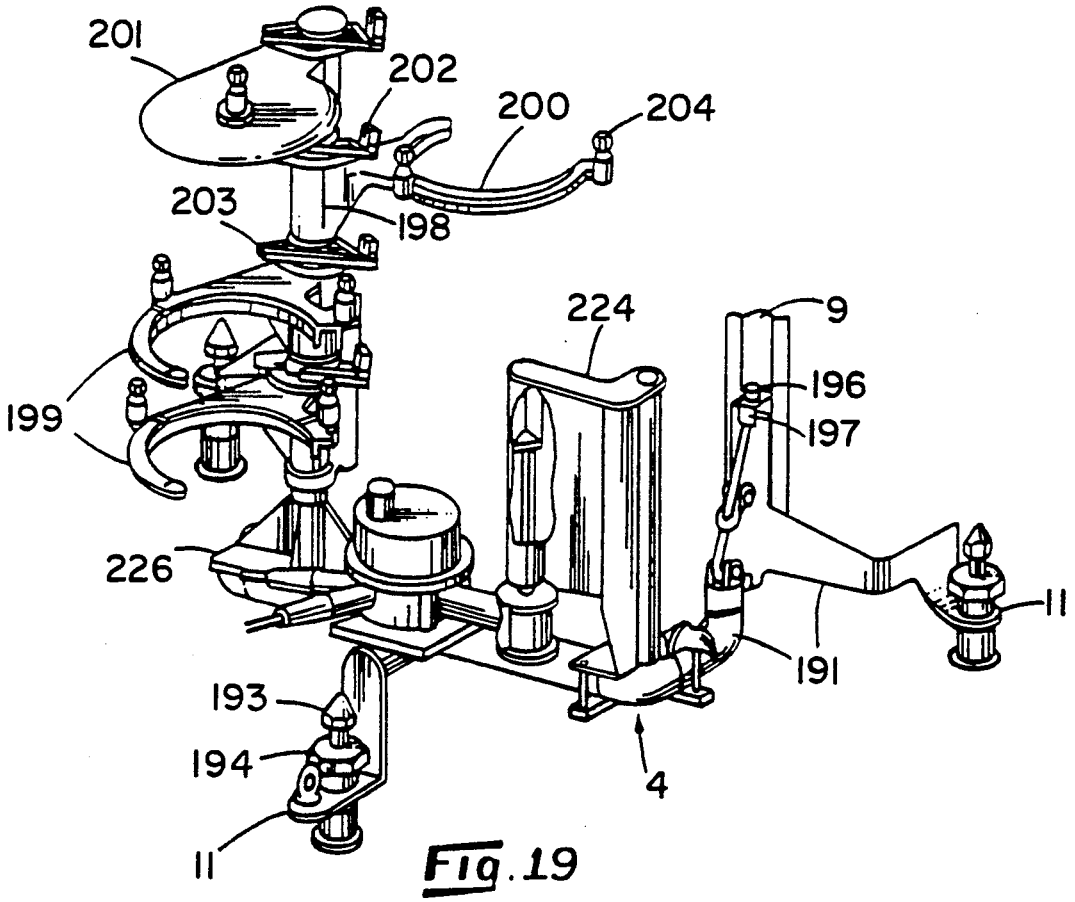
FIG. 19 shows a rod guide and storage rack in accordance with the present invention.

The rod guide and instrument storage rack (shown at 4 in FIG. 1) provide two functions: (1) the storage rack provides a location to store each measuring instrument when not in use, and rod guide centers and stabilizes the lower end of the (2) the rod guide centers and stabilizes the lower end of the fuel rod. As shown in FIG. 19, the rod guide and storage rack includes three assemblies of a frame, a storage rack, and a rod guide.

The frame 191 is a U-shaped pipe structure which sits on three adjustable legs 11. The storage rack trays are leveled using the three leveling screws 193, and lock nuts 194. The frame is clamped to the vertical elevator T-slots 9 via hold down bolt 196 and top clamp 197 to align the rod guide and storage racks with the instrument table which is described later.

The storage rack includes column 198 which supports three storage trays 199, 200, mounted on the frame via storage rack mounting plate 226. Each storage tray includes a C-shaped arm which can support an instrument. Three horizontal pins (not shown) in the base of each instrument align the instrument in the storage tray. Each of these trays is manually rotated via a long handled tool (not shown) to a "stored" position (see 199) when the instrument is not being loaded or unloaded to the tray. Hex ball 204 works with the long handle tool to rotate the trays. A cover 201 above the three storage trays protects the instruments from falling objects when the trays are in the stored position. When the trays are rotated into the "load" position (see 200), the instrument table can pick up or set down an instrument. Each of the trays has two water flow switches 202, 203 which are used to, respectively, sense when the trays are in the "load" or "stored" position. Storage tray location is important during instrument loading or unloading onto the table and during instrument table vertical travel in order to prevent any damage thereto. Vertical travel is shutdown if any tray is in an incorrect position.

Figure 20:
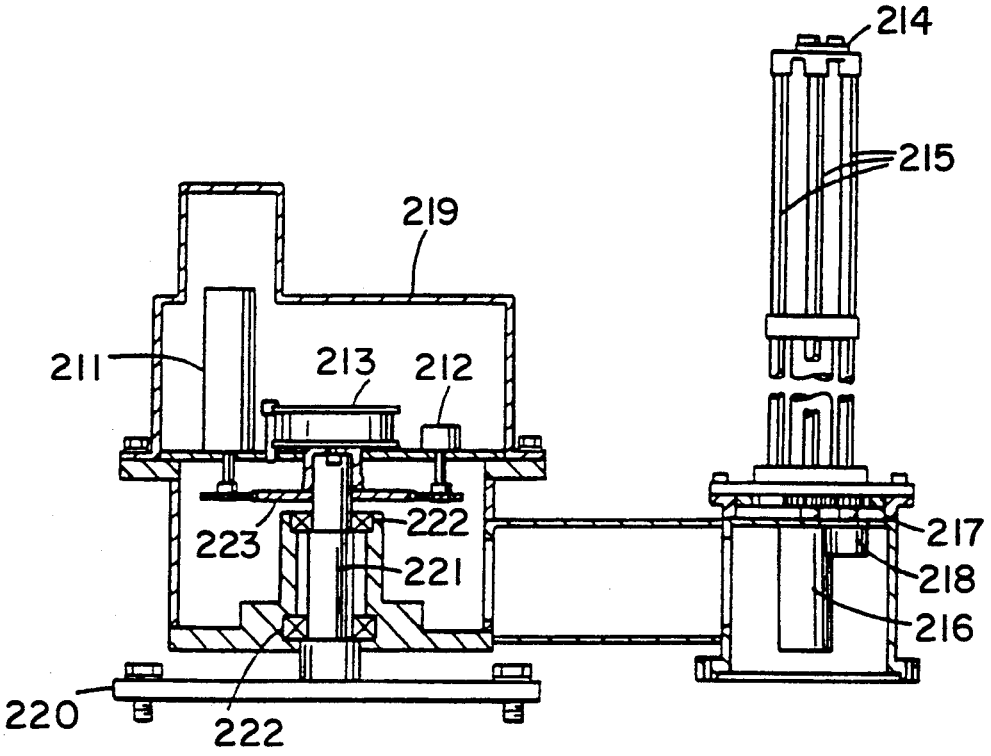
FIG. 20 is a cross-sectional view of the rod guide of the present invention.

The rod guide, as shown in FIG. 20, centers and stabilizes the bottom of the fuel rod. The entire housing is rotated via a DC motor 211. A position potentiometer 212 provides a remote indication of the housing position. A spring loaded reel 213 is mounted in the housing to reduce backlash. The fingers 214 which grip the rod are mounted on vertical shafts 215. The three shafts are rotated by DC motor 216 through an internal gear 217. The position of the fingers is detected by a potentiometer 218 and are positioned according to the rod size. The rod guide housing 219 is pressurized to prevent leaks from flooding the housing.

The rod guide also includes a stationary support shaft 221 on a mounting plate 220 supporting bearings 222 and a stationary gear 223. A rod guide cover 224 (shown in FIG. 19) covers the rod guide fingers 214.

Figure 21:
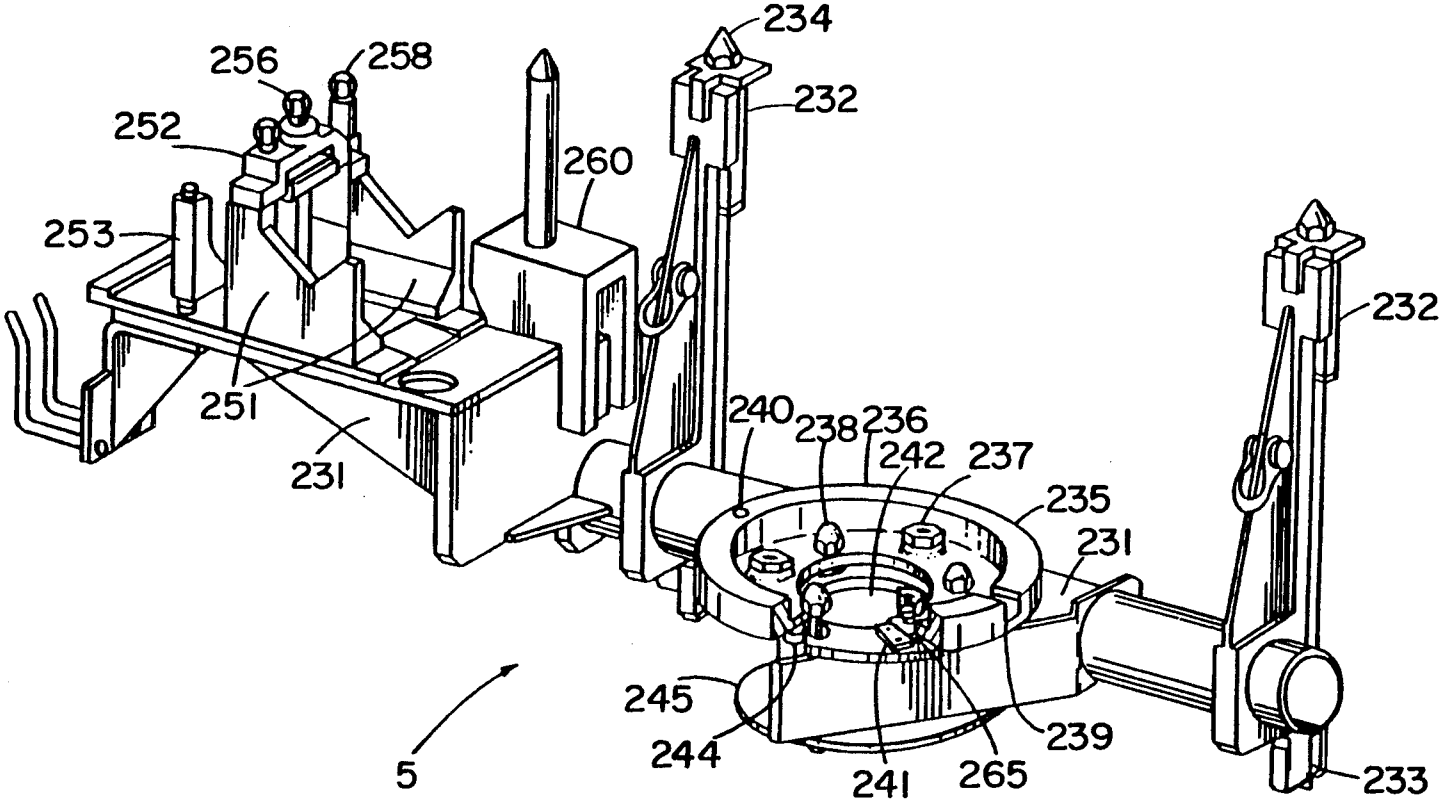
FIG. 21 is an instrument table in accordance with the present invention.
Figure 22:
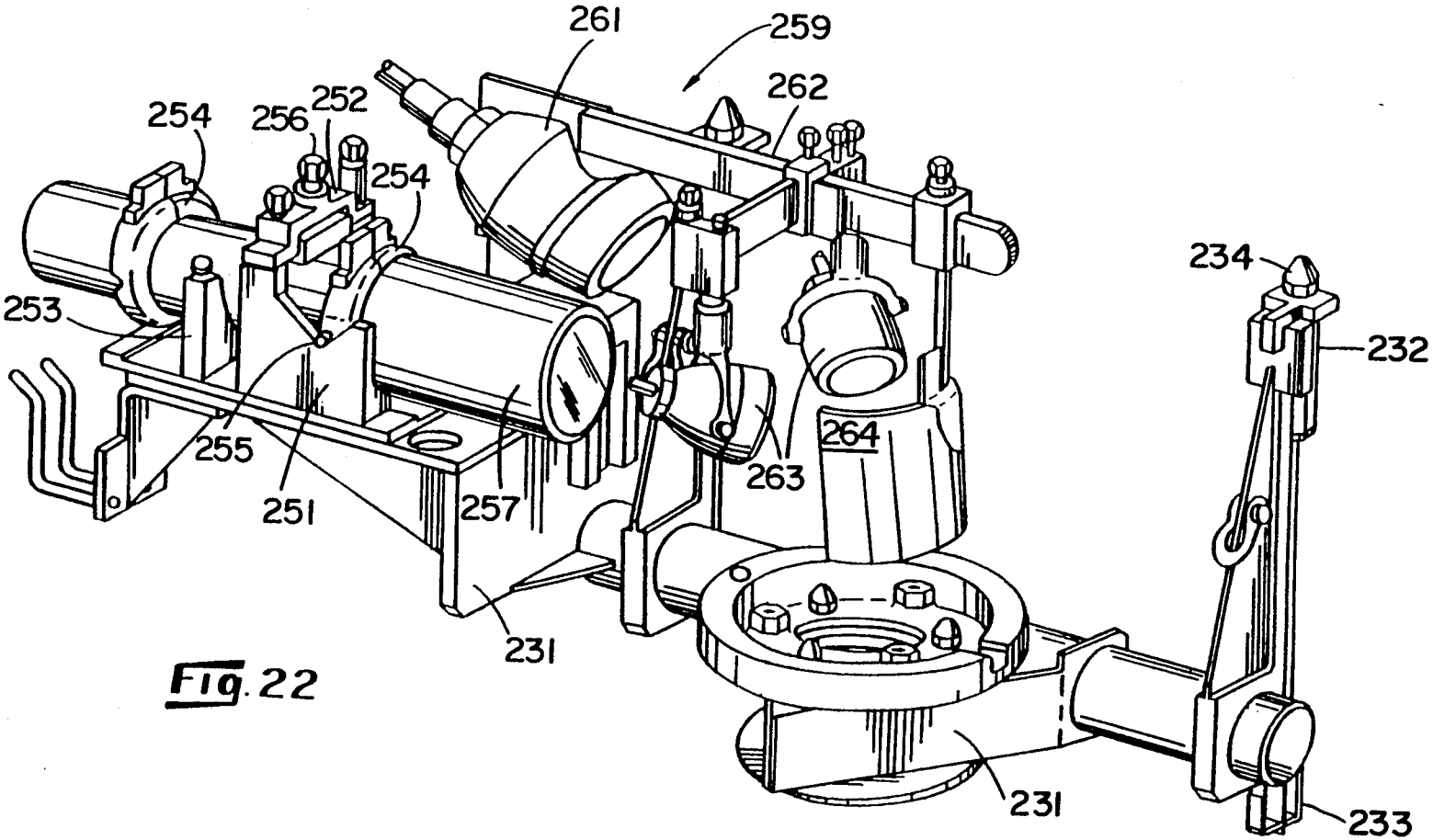
FIG. 22 shows the CCTV and light bracket mounted on the instrument table in accordance with the present invention.

The instrument table 5 is a platform for the instruments and CCTV camera which can travel the entire length of a suspended fuel rod. As shown in FIGS. 21 and 22, the instrument table has a frame structure 231 which is clamped to the T-slots of the transfer carriage via top clamps 232 and bottom clamps 233 using clamp bolts 234. The frame supports the leveling plate 235 and the supports for a CCTV camera and lights. The leveling plate 235 provides an instrument seating surface 236 for the instruments during rod examination.

The leveling plate 235 incorporates three compound leveling screws 237 and three clamp bolts 238 alternately spaced, 60 degrees apart. The leveling plate 235 rests on the three leveling screw pads 265 which are adjusted to obtain an overall level. The leveling plate is centered relative to the storage trays to allow each instrument to be loaded onto the leveling plate. The leveling plate is supported by three spring loaded vespel pads 244 during the centering operation and is then clamped to the frame 231 via the clamp bolts and the clamping plate 245. The leveling plate also contains an alignment hole 240, a slot 239 in the outer ring of the leveling plate 235, and key plates 241, which center and rotationally align each instrument on the table. A hole 242 through the center of the leveling plate allows the entire instrument table to travel below the top of the rod guide fingers (see 214 in FIG. 20), while the rod guide is centering the fuel rod and no instrument is on the table.

The CCTV camera and lights are mounted on the frame of the instrument table. The CCTV camera 257 is used to obtain video tapes for the length, visual, and bow measurements. The camera mount, as shown in FIGS. 21 and 22, includes V-blocks 251. FIG. 22 shows a hold-down bar 252, and a spring loaded saddle 253. The CCTV camera is fitted with two circumferential bands 254. Each band has a set of horizontal pins 255 mounted 180 degrees apart. The two pins fit into the V-blocks, while the back of the camera sits in the spring loaded saddle and tightening bolts 258 tighten down the hold-down bar 252. The leveling screw 256 in the hold-down bar determines the amount of camera tilt. The camera is normally in the horizontal position, but can be tilted down by backing off the leveling screw to view the axial profilometer, if desired.

A separate bracket, generally shown at 259, positioned on light bracket base 260 (see FIG. 21), centers a 500 watt Birns underwater light 261 directly over the CCTV. A pivoting arm 262 on the light bracket positions two 250 watt Birns lights 263 and a tilted, semi-circular background 264 at the center of the table. The 250 watt lights and background are swung into position over the instrument table for the visual and bow examinations. When an instrument head is loaded onto the table, the light arm is pivoted 180 degrees out of the way.

The REX is a semi-automatically operated robotic system controlled by programmable logic controller (PLC), such as a Gould Modicon 584 programmable logic controller, and a computer, such as a Compaq portable personal computer, although other control systems can also be used. The PLC operates the larger drive motors, performs various housekeeping chores, and controls the operator's panel.

Figure 23:
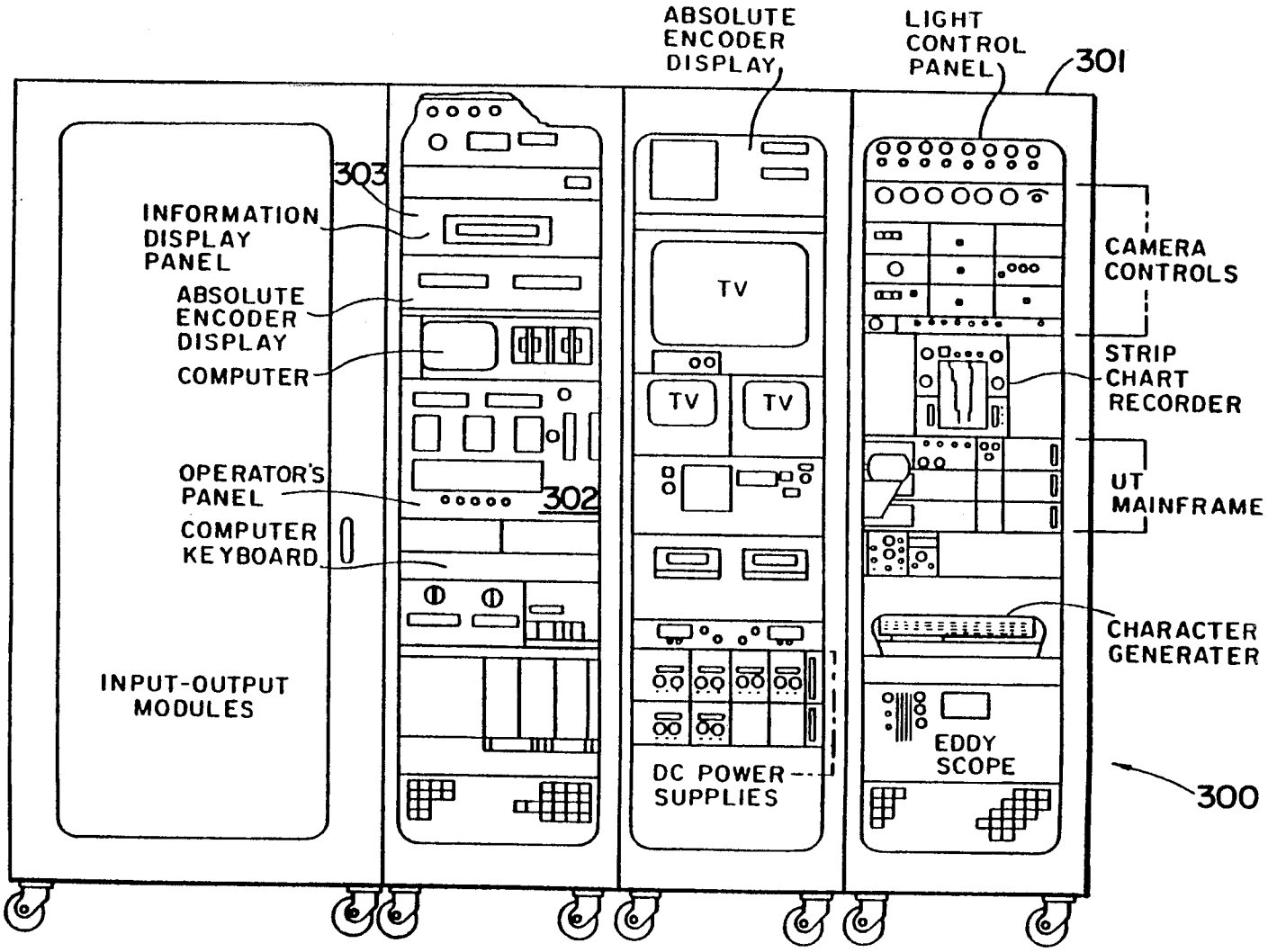
FIG. 23 shows the control console of the present invention.

The computer collects and stores the data received from the non-destructive fuel rod examinations, operates the DC motors on the axial and orbiting profilometers, and acts as an electronic route card to guide the operator through the various non-destructive fuel rod examinations. FIG. 2 shows the REX control system block diagram and FIG. 23 shows a sketch of the REX control console. The control and data acquisition system 300 is mounted in a control cabinet 301 which is located adjacent to the water pit area. All REX operations are initiated through either the operator's panel (see 350, in FIG. 24) or the computer. Operation of the REX is aided by four underwater CCTV cameras, one mounted on the instrument table, a second mounted on the water pit floor viewing the rod guide and storage rack, a third mounted under the work platform directed down o the entire REX, and a fourth mounted against the water pit wall looking at the collet and fuel rod interface.

The instrument table camera can be an Edo Western Model 1600HR CCTV camera. It has an image or picture resolution of 800 horizontal TV lines at 525 lines per frame. It is capable of resolving all 10 Electronic Industries Association (EIA) test pattern gray shades with only one footcandle faceplate highlight illumination. The camera is equipped with a stainless steel underwater housing and is capable of operating at depths of up to 100 feet. It is certified to withstand accumulated radiation up to $10^8$ R. The macro-zoom lens provides wide angle viewing (1×) of the instruments on the instrument table and magnifies the fuel rod image for the visual examinations and bow measurement to a 5× magnification. The TV monitor is a 19 inch, solid state design and has a center screen resolution of 800 TV lines minimum. Two video cassette recorders are hooked in parallel to obtain two sets of video tapes.

The video system also includes a character generator for displaying messages or data on the TV monitor. All data displayed on the monitor are sent to the character generator from the computer. The character generator is also used to display a "trigger" which is used to automate the rod bow measurement video digitizing.

Figure 24:
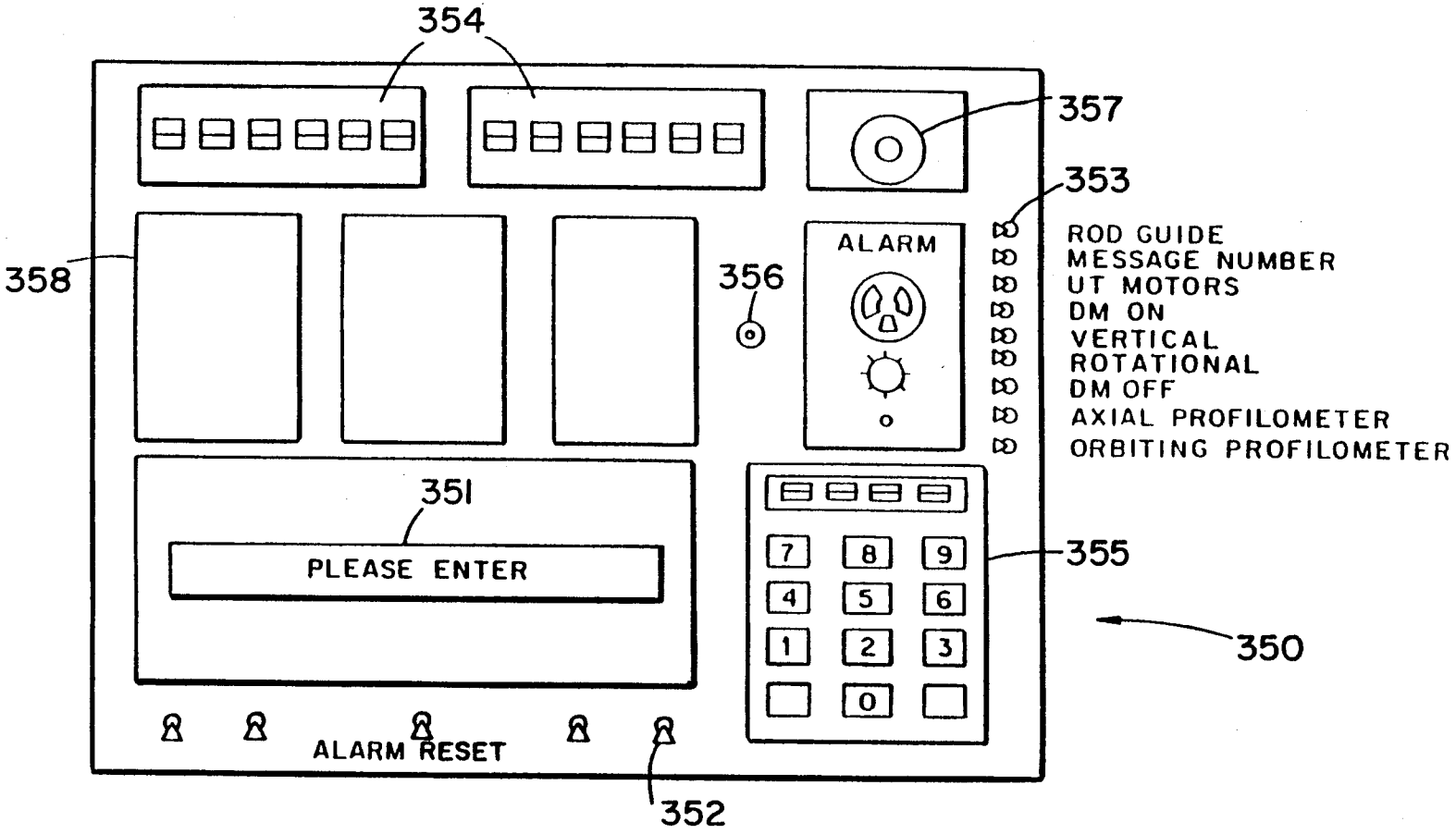
FIG. 24 shows the operators panel in accordance with the present invention.

The operators panel, as shown in FIG. 24, is the means for the operator to control mechanisms under the cognizance of the PLC and display the status of the system. The operator's panel is located in the control console 302, as shown in FIG. 23. The central feature of the operator's panel is a preprogrammed message panel 351. This message panel identifies the mechanism under control and the operation to be performed. The PLC sends a signal to the message panel which determines the preprogrammed message displayed on the message panel. A single row of five toggle switches 352 is located under the message panel. The message displayed on the message panel also indicates which switches are programmed into operation for the step to be performed. Before a mechanism movement can occur, the operator is required to apply power to the mechanism by selecting the appropriate power control switch(s) 353. This system of power activation interlock assures that all motor power is disconnected to prevent inadvertent mechanism movement. The operator's panel provides digital position data or parameter readings to the operator on two digital displays 354 in accordance with the operation being performed. Normally, one digital display shows the current position of the mechanism, while the second digital display shows the mechanisms programmed destination. The PLC collects the operational information from the various instruments mounted in the control console, and directs the data to the operator's panel. The operator's panel also provides a keypad 355 which allows the operator to manually select the operation to be performed from the message panel 351. A second message panel (see 303 in FIG. 23), located above the operator's panel, instructs the operator on the status of alarms and provides an alarm and message upon detection of a mechanism hold interlock or system malfunction. The operator's panel also includes a screen sequence advance button 356 and an emergency stop button 357. Status message columns 358 are also provided, but not used in the present invention.

The PLC, as the central control system, is a package of integrated circuit logic which provides all the control signals needed to operate the REX. All electrical units have access to the PLC logic circuits for instructions and commands needed to perform the given task. The logic circuits contained in the PLC are pre-programmed to perform the operations of the equipment.

The REX uses a Modicon Model 584 PLC to aid in the control of the REX. This PLC is a standard off the shelf item which can be replaced easily in event of total failure. It incorporates a Complementary Metal Oxide Semiconductor (CMOS) memory with a lithium battery back-up. The memory contains pre-programmed instructions to implement a specific sequence of operations and functions. These functions include Boolean algebra, sequencing, tabulating, timing, analog to digital conversion, counting, and arithmetic computation to control mechanisms, processes or operations. The PLC considers the whole sequence of the operations and interacts continually with external devices or the operator to perform, correct, or modify an operation as required. Additionally, the PLC is designed to operate in an industrial environment, unaffected by electromagnetic interference, dust, dirt, extremes in temperature and humidity, and power line voltage fluctuations.

The Input/Output (I/O) Section is the main interface terminal between the PLC and switches, DC servomotors, absolute encoders, temperature, pressure, flow and humidity sensors, and the operator panel. The system can utilize the industrial Modicon 200 Series I/O plug-in modules, which contains 16 input or output circuits per module. Complete error checking by redundant transmission and echo checking provides maximum system integrity from the processor to I/O modules.

Operational sequences of the REX are programmed into memory in common ladder logic using a standard keyboard (P190 programmer). A CRT contained in the programmer displays the circuit diagram during programming and, in operation, indicates the flow of active circuit paths as various switches or sequences are executed. Circuit design changes, tests, and modified operations are immediately performed without resorting to hand wiring circuit boards. After programming is completed, the P190 terminal is disconnected and retained for use as a maintenance tool for diagnosing and troubleshooting system operations.

Servomotors supply power for operation of the REX rod rotator and VIG elevator vertical drive mechanisms. The servomotors operate from a control chassis which furnished DC power, speed control, speed sequencing, data storage, and position monitoring. The servomotor controller obtains digital information and direction from the PLC I/O modules and then designates the number of turns the motor is to be rotated to reach the desired position. The control chassis converts the information into motor pulses to rotate the motor shaft accurately to the precise point needed. The pulse width of the motor power driver is modulated to supply the torque requirements of the load. Additionally, for high inertial loads, as in the case of the vertical drive, the motor is started as a slow drive pulse rate, which is increased on a preprogrammed ramp until the desired running speed is achieved. As the motor is about to accomplish the required travel, the motor pulses are slowed to bring the load to a smooth stop. The motor speed and ramp revolution rate are maintained at the required limit by means of tachometer feedback. Motion response of the motor is monitored by a resolver attached to the motor shaft. Thus, all motion commands from the PLC can be directed to the motor control chassis. The control chassis in turn then monitors the response of the motor to assure that the commands are carried out accurately. The PLC, in turn, monitors the independent absolute encoder to assure the motion commands are properly carried out.

The three instruments and the rod guide use DC motors to provide movement. The motors are a 12 volt DC, 4-amp motor with a gear reducer incorporated in the motor frames. DC motors are used because of ease of control and less restrictive positioning requirements. These motors are powered from DC power supplies, as controlled by the PLC or computer. A position encoder feedback monitors the travel of the instrument mechanisms and rod guide. In addition, current limiting circuits in the power supplies assure the limitations of torque to the mechanisms. Each mechanism used in the REX is equipped with an independent, absolute position encoding device to inform the control system of its position. In this manner, encoders provide operational feedback to the PLC or computer for any command given to a mechanism. The encoder position display informs the operator of the progress of the event.

The major mechanisms, such as the vertical drive, rod rotator, axial profilometer backup roller, and orbiting profilometer rotating platform, each have a position resolver on the turning shafts for translating the shaft movement into distance units. The encoders are of the absolute position type, which upon application of power provide immediate position location. The data furnished by the absolute encoder provide the control electronics with information for positioning the mechanisms to a particular address, and computing operating travel limits on the mechanisms. The vertical drive and rod rotator encoders are monitored by the PLC, while the axial and orbiting profilometer encoders are monitored by the computer.

A position encoding potentiometer is used to transmit the absolute position of less critical operations, such as the rod guide and the UT transducers. Because the accuracy required for rotational position does not exceed several degrees for the rod guide and several mils for the UT transducers, this form of position transducer is cost effective.

The REX can use a Compaq portable personal computer for data acquisition, instrument control, and operator instruction. The computer can contain dual 360K floppy disk drives with a 8087 math compressor to speed computer operation. The computer can communicate with other devices through two RS-232-C serial ports, one parallel port and another serial port.

The data collected during rod examination from the axial profilometer and orbiting profilometer magnescale probes, eddy current probe, UT transducers, VIG vertical evaluation, and rod rotator (i.e., fuel rod) position are stored in the computer memory during the exam, and then are saved to disk after the exam completion. The computer also directs operation of the axial profilometer backup roller and orbiting profilometer rotating platform. The computer controls these two DC motors to allow faster data collection. Finally, the computer acts as an electronic route card to step the operator and control system through the proper examination sequence. The role of an electronic route card requires the computer to communicate directly with the PLC, since the PLC controls most mechanism movements. The computer sends a digital code to the PLC. Each digital code is interpreted as a sequence of preprogrammed instructions in the PLC. The PLC then automatically displays the instructions on the operators panel for the operator to execute. Handshake signals assure that the information is properly communicated between the computer and PLC.

The computer communicates directly with the axial and orbiting profilometer DC motors, encoders, and magnescale probes through the computer bus interface. The computer bus interface also provides a manual drive panel for the instrument axes, and digital displays for the axial and orbiting profilometer magnescale probes.

Communications between the computer and the DC motors, encoders and magnescale probes travel over a pair of wires operated in a high speed serial transmission system. The system is called the Data Path Ways (DPW). The communications over the DPW is only on an as-needed basis determined by the compute programming and does not monitor every machine cycle like the PLC. Operation in this manner of these less critical small mechanisms is justified by the trade-off for speed of operation.

The DPW is a communication integrated circuit called Addressable Asynchronous Receiver-Transmitter (AART). The AART system includes a master AART unit which talks and listens to the computer data and address bus. The master AART in turn controls a number of slave AART integrated circuits.

The computer, in following the programmed instructions, calls for a DPW operation by feeding a code number and data code to the master AART. This information, once properly interpreted by the AART, sends out a serial command address to call up a particular slave AART. The slave integrated circuit (IC) addressed by the master AART, directs the proper voltage levels on its input or output lines. All other slave circuits not addressed by the AART are in the stand-by mode.

The communications between the PLC and the computer make the REX an easy system to operate, because they allow the incorporation of a machine which easily controls the mechanism (PLC) and a machine which easily collects data (computer). The data occur over a standard RS-232-C serial transmission at a 4800 baud rate. In order to speed the communications cycle between the PLC and the computer, initiation of and acknowledgement of the data transmissions is provided with eight handshake lines (four read and four write) through the PLC I/O modules and the computer DPW system. A problem of communications speed can be caused by asynchronous operation of the two systems. The PLC has a relatively slow scan cycle which is constantly monitoring operations. The computer in turn directs attention to the PLC only when the computer program calls for it to do so. Because the computer is faster than the PLC in interpreting and responding to a single command, any instruction sent to the PLC requires the computer to stop and wait for the PLC to complete a check cycle and acknowledge the information through the I/O signal lines to determine that a valid command instruction has been received. Thus, only after the PLC acknowledges the command is the computer free to perform the next instruction. If all communications and acknowledgements in both directions were to be provided through the serial RS-232-C line exclusively, the transmission and vertification of commands would have been considerably slower.

As an illustration, the computer can obtain VIG vertical position, rod rotator position and digitized UT data from the PLC as required by the program. The computer transmits a numerical code to the PLC which is interpreted as a sequence of steps on the operator's panel. Transfer of data in either direction is always initiated with the use of the handshake lines. For example, the computer would request the vertical elevation position by signaling the PLC on the designated handshake line that it wants to receive the vertical elevation data over the RS-232-C line. After the transmission, the computer confirms it has received the vertical elevation by signaling on the handshake lines. By this means, data transmissions from the PLC to the computer can be completed in less then one second. The above sequence is used for data transfer in both directions.

SUMMARY

The REX was used to nondestructively characterize 19 fuel rods in a highly controlled manner without damaging the fuel rods. Table 1 shows that the REX met all the examination accuracy requirements. In fact, the examination accuracies achieved approached the accuracy of the individual measuring instrument. After the REX operators were trained on the REX equipment and control system, the REX system proved to be easy to operate through the use of the computer as an electronic route card and the pre-programmed operating sequences on the message panel.

The REX can achieve a production rate of 6 working days per rod.

TABLE 1

| | Summary of REX Accuracies | |
|---|---|---|
| Measurement | Objective | Actual |
| Rod Diameter | 2 sigma accuracy for average diameter ≦ 0.20 mil | 2 sigma accuracy = 0.16 mil (based on 105 measurements) |
| Fuel Rod Wear Mark Depth | 2 sigma accuracy for maximum depth ≦ 0.20 mil | 2 sigma accuracy = 0.16 mils (based on 162 measurements of standard flats) |
| Rod Bow | 2 sigma accuracy for bow ≦ 6.0 mils | 2 sigma accuracy = 5.8 mil (based on data for 14 rods) |
| Oxide Thickness | None specified | 2 sigma accuracy = 0.15 mil (based on 258 measurements) |
| Clad Cracks | None specified | Consistency able to detect cracks 4 mils or greater on standards |
| Rod Length | Accuracy ≦ 10 mils | 2 sigma accuracy = 8.2 mils (based on 36 measurements) |

The control system design provides an easy and safe system to operate. Not only does the control system present the correct steps to perform the nondestructive examination, the interlocks built into the control system prevent damage to the fuel rod or any REX equipment. The PLC will terminate operations if a dangerous situation is about to occur.

The modular design of the REX components allows removal of entire REX. This includes the measuring instruments, the rod guide, the rod rotator motor, CCTV camera, and lights. The modular nature of the equipment also permits the deletion or postponement of various examinations depending upon equipment availability. For example, if the axial profilometer is not available, the operators can still perform the length measurement, visual and bow exams, cladding defect exam, ovality measurement, and wear mark characterization. Diameter and oxide thickness measurements can be done later if desired.

We claim:

1. A rod examination gauge comprising:

vertical elevator means, support platform means mounted at the top of the elevator frame means for supporting a fuel rod, rod guide means mounted at the bottom of the elevator frame means for guiding the fuel rod, storage rack means arranged at the bottom of the elevator frame means for storing instruments means, and instrument table means mounted on the transfer carriage of the elevator means for holding instruments means for measuring the fuel rod and a closed circuit television camera for viewing the fuel rod.

2. The rod examination gauge of claim 1, wherein the instruments means include axial profilometer means for measuring fuel rod diameter and oxide thickness, orbiting profilometer means for measuring fuel rod wear mark depth and volume and fuel rod ovality, and ultrasonic instrument means for detecting rod cladding defects.

3. The rod examination gauge of claim 2, wherein the axial profilometer means includes a roller assembly means for aligning and positioning the fuel rod in the center of the axial profilometer means, and a drive assembly means connected to DC motor for driving the roller assembly through a pressured and watertight junction box.

4. The rod examination gauge of claim 3, wherein the axial profilometer means includes a magnescale probe assembly for measuring the diameter of the fuel rod.

5. The rod examination gauge of claim 4, wherein the axial profilometer means includes an eddy current probe means for measuring the fuel rod oxide thickness.

6. The rod examination gauge of claim 2, wherein the orbiting profilometer means includes a roller assembly means for gripping and centering the fuel rod, and a rotary platform means driven by a DC motor for driving the roller assembly.

7. The rod examination gauge of claim 6, wherein the orbiting profilometer means includes a magnescale probe assembly for measuring fuel rod wear marks and rod ovality.

8. The rod examination gauge of claim 2, wherein the ultrasonic instrument means includes a roller assembly means for gripping and maintaining the fuel rod at the center of the ultrasonic instrument means.

9. The rod examination gauge of claim 8, wherein the ultrasonic instrument means includes a longitudinal transducer and a circumferential transducer, each driven by a motor for providing x- and y- directional orientation thereof.

10. The rod examination gauge of claim 1, wherein the support platform means includes standard bars of different rod diameters for calibrating the instruments means.

11. The rod examination gauge of claim 10, wherein the support platform means is arranged to receive a rod caddy means for holding and transporting a fuel rod.

12. The rod examination gauge of claim 11, wherein the support platform means include a rod rotator motor means for providing angular orientation of a fuel rod therein, and storage support means for storing the standard bars and for holding the rod caddy.

13. The rod examination gauge of claim 10, wherein a rod suspension assembly is provided for holding the fuel rod, the rod suspension assembly including a suspension device, a secondary drop protection wire, and collet means for grasping fuel rod.

14. The rod examination gauge of claim 13, wherein the rod suspension device includes a drive shaft coupler having a coupler slot for engaging the rod rotator motor, a universal joint, a pin, and a retainer nut, and wherein the suspension device means is tapered to fit within an examination port on the support platform means.

15. The rod examination gauge of 14, wherein the collet means includes a J-slot associated with a spring for accepting the pin of the rod suspension device, and fingers for accepting the fuel rod.

* * * * *